(12) United States Patent
Tsuchitori et al.

(10) Patent No.: US 12,129,923 B1
(45) Date of Patent: Oct. 29, 2024

(54) CONTROL SYSTEM OF VEHICLE INCLUDING AUTOMATIC TRANSMISSION

(71) Applicant: Mazda Motor Corporation, Hiroshima (JP)

(72) Inventors: Yuki Tsuchitori, Aki-gun (JP); Manabu Sasahara, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/635,244

(22) Filed: Apr. 15, 2024

(30) Foreign Application Priority Data

Apr. 26, 2023 (JP) ................................. 2023-072280

(51) Int. Cl.
*F16H 61/04* (2006.01)
*F16H 61/682* (2006.01)

(52) U.S. Cl.
CPC ....... *F16H 61/0403* (2013.01); *F16H 61/682* (2013.01); *F16H 2200/006* (2013.01); *F16H 2200/2012* (2013.01); *F16H 2200/2015* (2013.01); *F16H 2200/2023* (2013.01); *F16H 2200/2043* (2013.01); *F16H 2306/44* (2013.01)

(58) Field of Classification Search
CPC ............... F16H 61/0403; F16H 61/682; F16H 2200/006; F16H 2200/2012; F16H 2200/2015; F16H 2200/2023; F16H 2200/2043; F16H 2306/44
See application file for complete search history.

(56) References Cited

U.S. PATENT DOCUMENTS

| 9,989,127 | B2 | 6/2018 | Kamada et al. |
| 2017/0268606 | A1* | 9/2017 | Park .......................... F16H 3/666 |
| 2018/0118214 | A1* | 5/2018 | McDonnell ........... B60W 10/06 |
| 2019/0263249 | A1* | 8/2019 | Kawai ..................... B60K 6/547 |
| 2021/0215247 | A1* | 7/2021 | Tachibanada ........... F16H 61/16 |

FOREIGN PATENT DOCUMENTS

WO   2016063857 A1   4/2016

* cited by examiner

*Primary Examiner* — Justin Holmes
(74) *Attorney, Agent, or Firm* — Alleman Hall & Tuttle LLP

(57) ABSTRACT

A control system of a vehicle includes an automatic transmission provided with a plurality of friction engagement elements changeable between engaged and disengaged states, and configured to form a plurality of gear stages by changing a combination of three friction engagement elements to be selectively engaged among the friction engagement elements, and a controller which controls the change between the engaged and disengaged states of each friction engagement element. The controller performs a neutral control in which, for setting the automatic transmission to a neutral state in which a driving force of a drive source is not transmitted to driving wheels, while two of the three friction engagement elements engaged when forming each gear stage are kept engaged, the remaining one of the three friction engagement element is disengaged. The two friction engagement elements engaged during the neutral control are common in at least two adjacent gear stages.

9 Claims, 6 Drawing Sheets

|  | REV GEAR | 1ST GEAR | 2ND GEAR | 3RD GEAR | 4TH GEAR | 5TH GEAR | 6TH GEAR | 7TH GEAR | 8TH GEAR |
|---|---|---|---|---|---|---|---|---|---|
| CL1 |  | O |  | O |  | O | O | O |  |
| CL2 |  |  | O | O | O |  | O |  | O |
| CL3 | O |  |  |  | O | O | O | O | O |
| BR1 | O | O | O |  |  |  |  | O | O |
| BR2 | O | O | O | O | O | O |  |  |  |

⇩ NEUTRAL CONTROL IS PERFORMED

|  | Nrev | N1 | N2 | N3 | N4 | N5 | N6 | N7 | N8 |
|---|---|---|---|---|---|---|---|---|---|
| CL1 |  | × |  | × |  | × | × | × |  |
| CL2 |  |  | × | × | × |  | × |  | × |
| CL3 | × |  |  |  | O | O | O | O | O |
| BR1 | O | O | O |  |  |  |  | O | O |
| BR2 | O | O | O | O | O | O |  |  |  |

NEUTRAL TRAVELING PATTERN 1 — NEUTRAL TRAVELING PATTERN 2 — NEUTRAL TRAVELING PATTERN 3

|     | REV GEAR | 1ST GEAR | 2ND GEAR | 3RD GEAR | 4TH GEAR | 5TH GEAR | 6TH GEAR | 7TH GEAR | 8TH GEAR |
|-----|----------|----------|----------|----------|----------|----------|----------|----------|----------|
| CL1 |          | O        |          | O        |          | O        | O        | O        |          |
| CL2 |          |          | O        | O        | O        |          | O        |          | O        |
| CL3 | O        |          |          |          | O        | O        | O        | O        | O        |
| BR1 | O        | O        | O        |          |          |          |          | O        | O        |
| BR2 | O        | O        | O        | O        | O        | O        |          |          |          |

|     | REV GEAR | 1ST GEAR | 2ND GEAR | 3RD GEAR | 4TH GEAR | 5TH GEAR | 6TH GEAR | 7TH GEAR | 8TH GEAR |
|-----|----------|----------|----------|----------|----------|----------|----------|----------|----------|
| CL1 |          | ○        |          | ○        |          | ○        | ○        | ○        |          |
| CL2 |          |          | ○        | ○        | ○        |          | ○        |          | ○        |
| CL3 | ○        |          |          |          | ○        | ○        | ○        | ○        | ○        |
| BR1 | ○        | ○        | ○        |          |          |          |          | ○        | ○        |
| BR2 | ○        | ○        | ○        | ○        | ○        | ○        |          |          |          |

⬇ NEUTRAL CONTROL IS PERFORMED

|     | Nrev | N1 | N2 | N3 | N4 | N5 | N6 | N7 | N8 |
|-----|------|----|----|----|----|----|----|----|----|
| CL1 |      | ×  |    | ×  |    | ×  | ×  | ×  |    |
| CL2 |      |    | ×  | ×  | ×  |    | ×  |    | ×  |
| CL3 | ×    |    |    |    | ○  | ○  | ○  | ○  | ○  |
| BR1 | ○    | ○  | ○  |    |    |    |    | ○  | ○  |
| BR2 | ○    | ○  | ○  | ○  | ○  | ○  |    |    |    |

NEUTRAL TRAVELING PATTERN 1 (Nrev, N1, N2) — NEUTRAL TRAVELING PATTERN 2 (N3, N4, N5) — NEUTRAL TRAVELING PATTERN 3 (N6, N7, N8)

FIG. 5

|     | < V1 | ≥ V1, < V2 | ≥ V2 |
|-----|------|------------|------|
|     | NEUTRAL TRAVELING PATTERN 1 | NEUTRAL TRAVELING PATTERN 2 | NEUTRAL TRAVELING PATTERN 3 |
| CL1 |      |      |      |
| CL2 |      |      |      |
| CL3 |      | ○    | ○    |
| BR1 | ○    |      | ○    |
| BR2 | ○    | ○    |      |

FIG. 6

CONTROL SYSTEM OF VEHICLE INCLUDING AUTOMATIC TRANSMISSION

TECHNICAL FIELD

The present disclosure relates to a control system of a vehicle including an automatic transmission which is provided with a plurality of friction engagement elements, and forms a plurality of gear stages by selectively changing the friction engagement elements to be engaged.

BACKGROUND OF THE DISCLOSURE

Conventionally, a system is known, which includes an automatic transmission provided with a plurality of friction engagement elements which can be in either an engaged state or a disengaged state, and forms a plurality of gear stages by selectively changing the friction engagement element to be engaged, and a controller which performs a control for changing each of the friction engagement elements between the engaged state and the disengaged state. For example, WO2016/063857A1 discloses an automatic transmission which forms nine gear stages, comprised of forward first to eighth gears and a reverse gear, by changing a combination of three friction engagement elements which are selectively engaged among five friction engagement elements.

Meanwhile, a technique for controlling each state (engagement or disengagement) of a plurality of friction engagement elements in an automatic transmission so that the automatic transmission is set to a neutral state in which a driving force of a drive source, such as an engine, is not transmitted to driving wheels (a so-called neutral control) is known. In such a neutral control, the following problems may occur, if the number of engaged friction engagement elements among the plurality of friction engagement elements is reduced and the number of disengaged friction engagement elements is increased (in an extreme example, all the friction engagement elements are disengaged).

First, during the neutral control, a large number of rotating elements (gears, etc.) corresponding to the disengaged friction engagement elements in the automatic transmission rotate in an indefinite state due to various external factors, such as a traveling state of a vehicle, and a temperature state inside the automatic transmission. As a result, it becomes difficult to control the rotation of these rotating elements, and when the automatic transmission is changed from the neutral state to a normal state in which the driving force of the drive source is transmitted to the driving wheels (i.e., changed to a state in which the automatic transmission is set to a traveling range), an unexpected shock may occur. Second, since the number of engaged friction engagement elements in the automatic transmission increases when performing such a change, the responsiveness of the change to the traveling range deteriorates.

SUMMARY OF THE DISCLOSURE

The present disclosure is made in order to solve the problems of the conventional technology described above, and one purpose thereof is to provide a control system of a vehicle which sets the automatic transmission to a neutral state, which is capable of suppressing a shock and securing the responsiveness when changing the automatic transmission from the neutral state to a traveling range.

In order to achieve the above-described purpose, the present disclosure provides a control system of a vehicle, which includes an automatic transmission configured to transmit a driving force of a drive source of the vehicle to driving wheels, provided with a plurality of friction engagement elements changeable between an engaged state and a disengaged state, and configured to form a plurality of gear stages by changing a combination of three friction engagement elements to be selectively engaged among the plurality of friction engagement elements, and a controller configured to control the change between the engaged state and the disengaged state of each of the plurality of friction engagement elements of the automatic transmission. The controller performs a neutral control in which, in order to set the automatic transmission to a neutral state in which the driving force of the drive source is not transmitted to the driving wheels, while two of the three friction engagement elements engaged when forming each of the gear stages of the automatic transmission are kept engaged, the remaining one of the three friction engagement elements is disengaged. The controller performs the neutral control so that the two friction engagement elements engaged during the neutral control are common in at least two adjacent gear stages.

According to this configuration, the automatic transmission is set to the neutral state in the neutral control by, while two of the three friction engagement elements engaged when forming the gear stage of the automatic transmission are kept engaged, disengaging the one remaining friction engagement element. Thus, a shock can be suppressed from occurring when changing from the neutral state to the traveling range due to a large number of rotating elements corresponding to the friction engagement elements rotating in an indefinite state inside the automatic transmission. Further, in the present disclosure, since the two friction engagement elements used for the gear stage formation in the neutral control are kept engaged, and these two friction engagement elements are used commonly in at least two adjacent gear stages, only one friction engagement element according to the gear stage to be applied is required to be engaged. Therefore, the responsiveness of the change from the neutral state to the traveling range can be secured.

In the present disclosure, the controller may realize a plurality of neutral traveling patterns by changing a combination of the two friction engagement elements selectively engaged among the plurality of friction engagement elements during the neutral control. A number of the neutral traveling patterns may be less than a number of the gear stages. In the present disclosure, as described above, the two friction engagement elements which are engaged during the neutral control are used commonly in at least two adjacent gear stages. Thus, the number of neutral traveling patterns becomes less than the number of gear stages in the traveling range. Therefore, it becomes possible to simplify the control configuration related to the neutral control.

In the present disclosure, the controller may set a neutral traveling pattern to be selectively applied among the plurality of neutral traveling patterns based on a vehicle speed. As described above, the present disclosure applies the neutral traveling patterns in which two of three friction engagement elements which are used for gear stage formation are engaged. In other words, the friction engagement elements engaged in each of the plurality of neutral traveling patterns are defined based on the friction engagement element engaged at each of the gear stages according to the vehicle speed. Therefore, by applying the neutral traveling pattern according to the vehicle speed in the neutral control, the gear stage can be set promptly according to the vehicle speed, when changing from the neutral control to the traveling range.

In the present disclosure, while the vehicle travels in a state in which a range of the automatic transmission is set to a traveling range, the controller may start the neutral control, when a driver performs a shift operation to change the range of the automatic transmission from the traveling range to a neutral range. By such a configuration, according to the shift operation by the driver, the neutral control can be started promptly, and it becomes possible to exactly satisfy the change demand to the neutral range by the driver.

In the present disclosure, when the driver performs a shift operation to change the range of the automatic transmission from the neutral range to the traveling range during the neutral control, the controller may end the neutral control, and control the friction engagement elements to set the automatic transmission to a gear stage according to a vehicle speed. By such a configuration, according to the shift operation by the driver, the neutral control can be ended promptly, and the automatic transmission can be returned to the normal traveling range.

In the present disclosure, while the vehicle travels in a state in which a range of the automatic transmission is set to a traveling range, the controller may start the neutral control, when deceleration (absolute value) of the vehicle reaches a given value or more. According to this configuration, when the vehicle slows down suddenly, the neutral control can be started promptly.

In the present disclosure, when the deceleration (absolute value) of the vehicle decreases below the given value during the neutral control, the controller may end the neutral control, and control the friction engagement elements to set the automatic transmission to a gear stage according to a vehicle speed. According to this configuration, when the sudden deceleration of the vehicle is finished, the neutral control can be ended promptly to resume the automatic transmission back to the normal traveling range.

In the present disclosure, the control system may be applied to the vehicle such that the driving force of the drive source is transmitted to the driving wheels without intervention of a torque converter. Although in such a vehicle without the torque converter an engine stall may occur when the sudden deceleration occurs, by performing the neutral control promptly at this time, the engine stall can be prevented certainly.

BRIEF DESCRIPTION OF DRAWINGS

FIG. 5 illustrates engagement tables of the friction engagement elements of the automatic transmission in a neutral control according to the embodiment of the present disclosure.

FIG. 6 is a table illustrating neutral traveling patterns which are selectively applied according to a vehicle speed in the embodiment of the present disclosure.

DETAILED DESCRIPTION OF THE DISCLOSURE

Hereinafter, a control system of a vehicle including an automatic transmission according to one embodiment of the present disclosure is described with reference to the accompanying drawings.

[Overall Configuration]

Figure 1:
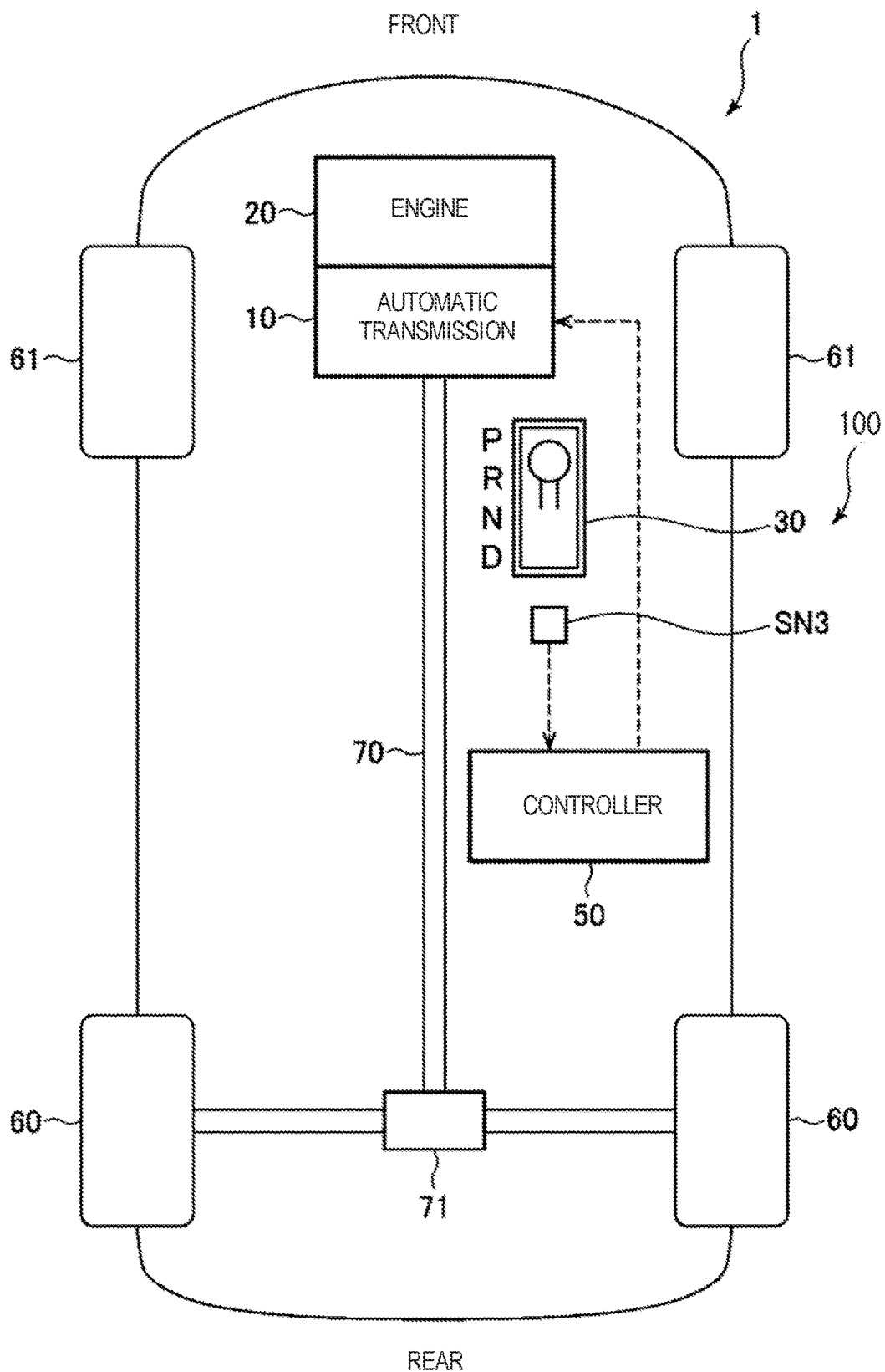
FIG. 1 is a view schematically illustrating a vehicle on which a control system including an automatic transmission according to one embodiment of the present disclosure is mounted.

FIG. 1 is a view schematically illustrating a vehicle on which a control system 100 according to this embodiment is mounted. As illustrated in FIG. 1, a vehicle 1 is a front-engine rear-drive type (FR type) vehicle, in which an engine 20 as a drive source is disposed at the front side of the vehicle 1, and an automatic transmission 10 is disposed rearward of the engine 20. A driving force of the engine 20 is transmitted to rear wheels (driving wheels) 60 via a power transmission path, such as the automatic transmission 10, a propeller shaft 70, and a differential gear 71 to propel the vehicle 1. In detail, in the vehicle 1, the automatic transmission 10 is not provided with a torque converter, and the driving force of the engine 20 is transmitted to the driving wheels 60 without intervention of the torque converter. Note that the present disclosure is not limited to the application to the FR type vehicle 1, but it may also be applied to various vehicles, such as front-engine front-drive type (FF type) vehicles which drive front driving wheels (front wheels 61).

A shift lever 30 is disposed inside a cabin of the vehicle 1. The shift lever 30 selects a range (shift range) of the automatic transmission 10, and the range includes a parking range "P-range," a reverse range "R-range," a neutral range "N-range," and a drive range "D-range." A driver of the vehicle 1 operates the shift lever 30 to select a desired range. Note that such a range may additionally include an "M-range" for setting the automatic transmission 10 to a manual mode. The D-range, R-range, and M-range correspond to traveling ranges, and the N-range and P-range correspond to non-traveling ranges.

For example, the automatic transmission 10 may be a shift-by-wire type automatic transmission. In this case, the range selected by operation of the shift lever 30 by the driver is detected by a shift position sensor SN3, and an electric signal based on the detection result of the shift position sensor SN3 is inputted into a controller 50. Then, the shift range of the automatic transmission 10 is changed by an output signal from the controller 50 based on the above-described electric signal.

[Configuration of Automatic Transmission]

Figure 2:
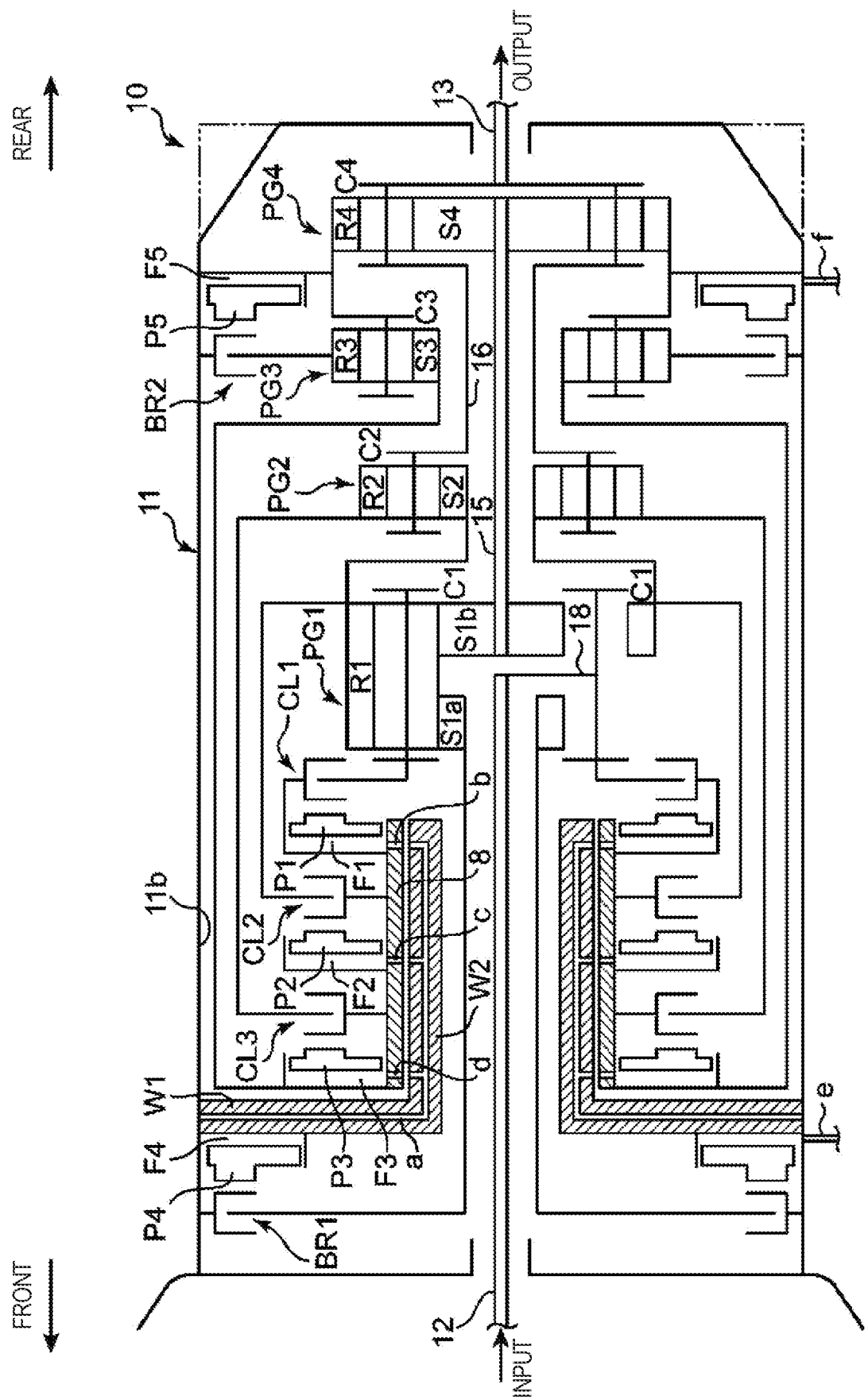
FIG. 2 is a view schematically illustrating an automatic transmission according to the embodiment of the present disclosure.

FIG. 2 is a view schematically illustrating the automatic transmission 10 according to this embodiment. As illustrated in FIG. 2, the automatic transmission 10 is a longitudinally-arranged automatic transmission, which includes a transmission case 11, an input shaft 12 inserted into the transmission case 11 from the engine 20, and an output shaft 13 projected from the inside of the transmission case 11 to the anti-drive-source side (the right side in this drawing). The automatic transmission 10 is disposed in a longitudinal posture in which the input shaft 12 and the output shaft 13 are disposed coaxially centering on an axis in the vehicle front-and-rear direction, and the input shaft 12 is located at the front side of the vehicle 1 and the output shaft 13 is located at the rear side of the vehicle 1. For this reason, below, the drive source side (the left side in this drawing) may be referred to as "the front side," and the anti-drive-source side (the right side in this drawing) may be referred to as "the rear side."

On the axis of the input shaft 12 and the output shaft 13, first, second, third, and fourth planetary gear sets (simply referred to as "the gear set") PG1, PG2, PG3, and PG4 are disposed sequentially from the front side (the drive source side).

Inside the transmission case 11, a first clutch CL1 is disposed forward of the first gear set PG1, a second clutch CL2 is disposed forward of the first clutch CL1, and a third clutch CL3 is disposed forward of the second clutch CL2. Further, a first brake BR1 is disposed forward of the third clutch CL3, and a second brake BR2 is disposed radially outside of the third gear set PG3. Thus, in the automatic transmission 10, from the front side (the drive source side), the first brake BR1, the third clutch CL3, the second clutch CL2, the first clutch CL1, and the second brake BR2 are disposed in this order in the axial direction. Note that the first to third clutches CL1-CL3, and the first and second brakes BR1 and BR2 correspond to "friction engagement elements" in the present disclosure. Below, the friction engagement element may suitably be denoted by a reference character "25" (illustrated in FIG. 4).

The first to fourth gear sets PG1-PG4 are of a single pinion type in which pinions supported by a carrier directly mesh with a sun gear and a ring gear. The first gear set PG1 has a first sun gear, a first ring gear R1, and a first carrier C1 as rotating elements. The second gear set PG2 has a second sun gear S2, a second ring gear R2, and a second carrier C2 as rotating elements. The third gear set PG3 has a third sun gear S3, a third ring gear R3, and a third carrier C3 as rotating elements. The fourth gear set PG4 has a fourth sun gear S4, a fourth ring gear R4, and a fourth carrier C4 as rotating elements.

The first gear set PG1 is of a double sun gear type in which the first sun gear is divided into two in the axial direction. That is, the first sun gear has a front-side first sun gear S1$a$ disposed at the front side in the axial direction, and a rear-side first sun gear S1$b$ disposed at the rear side. Since the pair of first sun gears S1$a$ and S1$b$ have the same number of teeth, and mesh with the same pinions supported by the first carrier C1, the rotational speeds of the first sun gears S1$a$ and S1$b$ are always equal. That is, the pair of front and rear first sun gears S1$a$ and S1$b$ always rotate at the same speed, and when one stops rotating, the other also stops rotating.

In this automatic transmission 10, the first sun gear (in detail, the rear-side first sun gear S1$b$) and the fourth sun gear S4 are always coupled to each other, the first ring gear R1 and the second sun gear S2 are always coupled to each other, the second carrier C2 and the fourth carrier C4 are always coupled to each other, and the third carrier C3 and the fourth ring gear R4 are always coupled to each other. The input shaft 12 is always coupled to the first carrier C1, and the output shaft 13 is always coupled to the fourth carrier C4. In detail, the input shaft 12 is coupled to the first carrier C1 via a power transmission member 18 which passes through between the pair of front and rear first sun gears S1$a$ and S1$b$. The rear-side first sun gear S1$b$ and the fourth sun gear S4 are coupled to each other via a power transmission member 15. The fourth carrier C4 and the second carrier C2 are coupled to each other via a power transmission member 16.

The first clutch CL1 engages and disengages the input shaft 12 and the first carrier C1 with/from the third sun gear S3, when a piston P1 reciprocates in the axial direction according to a hydraulic pressure being fed and discharged to/from a hydraulic pressure chamber F1 by a hydraulic pressure control valve (not illustrated) to change the first clutch CL1 between an engaged state and a disengaged state. The second clutch CL2 engages and disengages the first ring gear R1 and the second sun gear S2 with/from the third sun gear S3, when a piston P2 reciprocates in the axial direction according to a hydraulic pressure being fed and discharged to/from a hydraulic pressure chamber F2 by a hydraulic pressure control valve (not illustrated) to change the second clutch CL2 between an engaged state and a disengaged state. The third clutch CL3 engages and disengages the second ring gear R2 with/from the third sun gear S3, when a piston P3 reciprocates in the axial direction according to a hydraulic pressure being fed and discharged to/from a hydraulic pressure chamber F3 by a hydraulic pressure control valve (not illustrated) to change the third clutch CL3 between an engaged state and a disengaged state.

Meanwhile, the first brake BR1 engages and disengages the transmission case 11 with/from the beginning sun gear (in detail, the front-side first sun gear S1$a$), when a piston P4 reciprocates in the axial direction according to a hydraulic pressure being fed and discharged to/from a hydraulic pressure chamber F4 by a hydraulic pressure control valve (not illustrated) to change the first brake BR1 between an engaged state and a disengaged state. The second brake BR2 engages and disengages the transmission case 11 with/from the third ring gear R3, when a piston P5 reciprocates in the axial direction according to a hydraulic pressure being fed and discharged to/from a hydraulic pressure chamber F5 by a hydraulic pressure control valve (not illustrated) to change the second brake BR2 between an engaged state and a disengaged state.

The transmission case 11 has, at an axial position between the first brake BR1 and the third clutch CL3, an annular vertical wall part W1 extending radially inward from an inner circumferential surface 11$b$ of the transmission case 11, and a cylindrical cylinder wall part W2 extending rearward from an inner circumferential end of the vertical wall part W1. The cylinder wall part W2 is formed coaxially and so as to extend along an inner circumferential surface of a power transmission member 8.

Three housings lined up in the axial direction are formed radially outward of the power transmission member 8, and the pistons P1, P2, and P3 of the first clutch CL1, the second clutch CL2, and the third clutch CL3 are accommodated in the three housings, respectively.

Oil passages for supplying the hydraulic pressure to each of the hydraulic pressure chambers F1, F2, and F3 of the first clutch CL1, the second clutch CL2, and the third clutch CL3 are formed in the vertical wall part W1, the cylinder wall part W2, and the power transmission member 8. In detail, an oil passage a is formed in the vertical wall part W1 and the cylinder wall part W2, and oil passages b, c, and d are formed in the power transmission member 8. Then, the hydraulic pressure is supplied to the hydraulic pressure chamber F1 of the first clutch CL1 through the oil passages a and b, the hydraulic pressure is supplied to the hydraulic pressure chamber F2 of the second clutch CL2 through the oil passages a and c, and the hydraulic pressure is supplied to the hydraulic pressure chamber F3 of the third clutch CL3 through the oil passages a and d. Note that, although not illustrated, communicating parts between the oil passage a and the oil passages b, c, and d between an outer circumferential surface of the cylinder wall part W2 and an inner circumferential surface of the power transmission member 8 are sealed with seal rings.

The piston P4 of the first brake BR1 is accommodated in a housing formed forward of the vertical wall part W1. The hydraulic pressure chamber F4 divided by this housing directly communicates with an oil passage e from the outside of the transmission case 11 (valve body). The piston P5 of the second brake BR2 is accommodated in a housing which is fitted into the inner circumferential surface 11b of a rear part of the transmission case 11. The hydraulic pressure chamber F5 divided by this housing directly communicates with an oil passage f from the outside of the transmission case 11 (valve body).

Figures 3, 4:
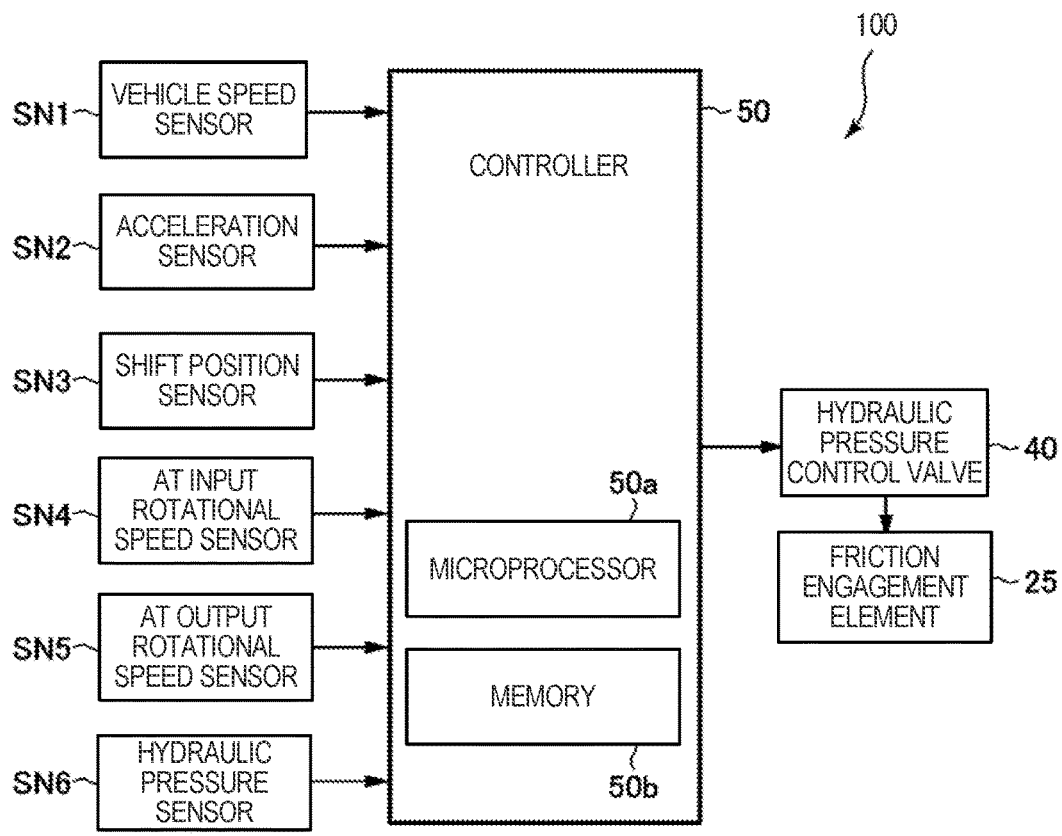
FIG. 3 is an engagement table of friction engagement elements of the automatic transmission according to the embodiment of the present disclosure.
FIG. 4 is a block diagram illustrating an electrical configuration of the control system of the vehicle according to the embodiment of the present disclosure.

Next, referring to FIG. 3, an engagement table of the friction engagement elements (25) of the automatic transmission 10 according to this embodiment is described. According to the automatic transmission 10 having the configuration described above, as illustrated in the engagement table of FIG. 3, any one of the gear stages (the forward first to the eighth gears and the reverse gear) is formed in the automatic transmission 10 by selectively engaging three specific friction engagement elements among the five friction engagement elements (the first to third clutches CL1-CL3, and the first and second brakes BR1 and BR2) based on a feeding-and-discharging control of the hydraulic pressure to the hydraulic pressure chambers F1-F5 by the hydraulic pressure control valve. Fundamentally, one of the plurality of gear stages according to the vehicle speed is selected and applied.

In detail, as illustrated in FIG. 3, the reverse gear is formed when the third clutch CL3, the first brake BR1, and the second brake BR2 are engaged. The first gear is formed when the first clutch CL1, the first brake BR1, and the second brake BR2 are engaged. The second gear is formed when the second clutch CL2, the first brake BR1, and the second brake BR2 are engaged. The third gear is formed when the first clutch CL1, the second clutch CL2, and the second brake BR2 are engaged. The fourth gear is formed when the second clutch CL2, the third clutch CL3, and the second brake BR2 are engaged. The fifth gear is formed when the first clutch CL1, the third clutch CL3, and the second brake BR2 are engaged. The sixth gear is formed when the first clutch CL1, the second clutch CL2, and the third clutch CL3 are engaged. The seventh gear is formed when the first clutch CL1, the third clutch CL3, and the first brake BR1 are engaged. The eighth gear is formed when the second clutch CL2, the third clutch CL3, and the first brake BR1 are engaged.

As can be seen from FIG. 3, in the adjacent gear stages, two friction engagement elements to be engaged are common. Thus, when changing between at least two adjacent gear stages, since one of engaged friction engagement elements is disengaged while two friction engagement elements are kept engaged, and another friction engagement element is engaged, the responsiveness of the gear stage change is secured.

[Electric Configuration]

Next, referring to FIG. 4, an electrical configuration of the control system 100 of the vehicle 1 according to this embodiment is described. As illustrated in FIG. 4, signals from a vehicle speed sensor SN1, an acceleration sensor SN2, the shift position sensor SN3, an AT input rotational speed sensor SN4, an AT output rotational speed sensor SN5, and a hydraulic pressure sensor SN6 are inputted into the controller 50. The speed sensor SN1 detects a speed of the vehicle 1 (vehicle speed). The acceleration sensor SN2 detects an acceleration (including a deceleration as well) of the vehicle 1. The shift position sensor SN3 detects a shift position of the shift lever 30 (i.e., a range (shift range) selected by operation of the shift lever 30). The AT input rotational speed sensor SN4 detects a rotational speed of the input shaft 12 of the automatic transmission 10, and the AT output rotational speed sensor SN5 detects a rotational speed of the output shaft 13 of the automatic transmission 10. The hydraulic pressure sensor SN6 detects the hydraulic pressure applied to each of the five friction engagement elements 25 (the first to third clutches CL1-CL3, and the first and second brakes BR1 and BR2).

The controller 50 is comprised of circuitry based on a well-known microcomputer. The controller 50 includes one or more microprocessors 50a as CPUs (Central Processing Units) which execute program(s), memory 50b which is comprised of, for example, RAM (Random Access Memory) and ROM (Read Only Memory) and stores the program(s) and the data, and an input/output bus which performs input/output of electric signals.

As illustrated in FIG. 4, the controller 50 mainly outputs a control signal to a hydraulic pressure control valve 40 of the friction engagement element 25 based on the signals from the sensors SN1-SN6 described above to control the hydraulic pressure applied to the friction engagement element 25 to change the state of the friction engagement element 25 between the engaged state and the disengaged state. The hydraulic pressure control valve 40 is provided to each of the five friction engagement elements 25 (the first to third clutches CL1-CL3, and the first and second brakes BR1 and BR2). In FIG. 4, for convenience of explanation, the hydraulic pressure control valve provided to each friction engagement element 25 is represented by one hydraulic pressure control valve 40. The hydraulic pressure control valve 40 is provided to each of the oil passages a-e which connect a hydraulic pump (not illustrated) to each of the hydraulic pressure chambers F1-F5 of the friction engagement elements 25, and is able to adjust the hydraulic pressure applied to each of the hydraulic pressure chambers F1-F5 of the friction engagement elements 25. Further, the hydraulic pressure sensor SN6 described above is provided on each of the oil passages a-e, between the hydraulic pressure control valve 40 and each of the hydraulic pressure chambers F1-F5 of the friction engagement elements 25.

The controller 50 controls the hydraulic pressure control valves 40 to adjust the hydraulic pressure applied to each of the five friction engagement elements 25 to change the five friction engagement elements 25 (the first to third clutches CL1-CL3, and the first and second brakes BR1 and BR2) between the engaged state and the disengaged state, thereby setting the automatic transmission 10 to a desired gear stage (see FIG. 3). Note that the controller 50 is comprised of an ECU (Electronic Control Unit) and a TCM (Transmission Control Module), for example.

[Neutral Control]

Next, a neutral control performed by the controller 50 in this embodiment is described. First, in order to set the automatic transmission 10 to a neutral state in which the driving force of the engine 20 is not transmitted to the driving wheels 60, the controller 50 performs a neutral control in which, while two of three friction engagement elements 25 which are engaged when forming each gear stage of the automatic transmission 10 are kept engaged, one remaining friction engagement element 25 is disengaged. Note that the automatic transmission 10 is configured to be in the neutral state in which the driving force of the engine 20 is not transmitted to the driving wheels 60 in the state in which only two friction engagement elements 25 are engaged.

In detail, while the vehicle travels in a state in which the range of the automatic transmission 10 is set to the traveling range (D-range or R-range), when the driver performs a shift operation to change the range of the automatic transmission 10 from the traveling range to the N-range (neutral range), the controller 50 controls the friction engagement element 25 to start the neutral control in order to realize the N-range demanded by the driver. Then, when the driver performs a shift operation to change the range of the automatic transmission 10 from the N-range to the traveling range during the neutral control, the controller 50 ends the neutral control, and controls the friction engagement elements 25 to set the automatic transmission 10 to a gear stage according to the vehicle speed.

Further, also when the deceleration (hereinafter, an absolute value) reaches a given value or more, while the vehicle 1 travels in the state in which the range of the automatic transmission 10 is set to the traveling range, the controller 50 controls the friction engagement elements 25 to start the neutral control. This is because the engine 20 may stall if the engine 20 is kept connected with the driving wheels 60, when such a large deceleration occurs in the vehicle 1 which is not provided with a torque converter as described above. Therefore, when the large deceleration occurs while the vehicle travels in the traveling range, the controller 50 performs the neutral control to cut the connection between the engine 20 and the driving wheels 60, thereby preventing the engine stall. Then, when the deceleration reaches the given value or more and then decreases below the given value, the controller 50 ends the neutral control, and controls the friction engagement elements 25 to set the automatic transmission 10 to a gear stage according to the vehicle speed.

Particularly, in this embodiment, the controller 50 performs the neutral control so that two friction engagement elements 25 which are engaged during the neutral control are common to at least two adjacent gear stages. That is, in this embodiment, two friction engagement elements 25 which are engaged in order to form the neutral state among three friction engagement elements 25 which are engaged in a certain gear stage are the same as two friction engagement elements 25 which are engaged in order to form the neutral state among three friction engagement elements 25 which are engaged in the adjacent gear stage.

Here, the neutral control in this embodiment is described in detail with reference to FIGS. 5 and 6. FIG. 5 illustrates engagement tables of the friction engagement elements 25 of the automatic transmission 10 in the neutral control according to this embodiment. In FIG. 5, an engagement table of the friction engagement elements 25 in the traveling range is illustrated in an upper part (the same engagement table as FIG. 3), and an engagement table of the friction engagement elements 25 in the neutral control is illustrated in a lower part. FIG. 6 illustrates a neutral traveling pattern which is applied according to the vehicle speed in this embodiment.

As illustrated in FIGS. 5 and 6, in this embodiment, as combinations of two friction engagement elements 25 which are engaged in the neutral control among the five friction engagement elements 25, three patterns (i.e., neutral traveling patterns 1, 2, and 3) are used. As described above, the gear stage according to the vehicle speed is applied in the traveling range, and, also in the neutral control, a pattern according to the vehicle speed is applied among the neutral traveling patterns 1, 2, and 3. In detail, as illustrated in FIG. 6, (1) When the vehicle speed is below a first vehicle speed V1 (e.g., below 30 km/h, which also includes below 0 km/h (i.e., reverse)), the neutral traveling pattern 1 is applied, (2) When the vehicle speed is the first vehicle speed V1 or more and below a second vehicle speed V2 (e.g., 30 km/h or more and below 50 km/h), the neutral traveling pattern 2 is applied, and (3) When the vehicle speed is the second vehicle speed V2 or more (e.g., 50 km/h or more), the neutral traveling pattern 3 is applied.

Further, as illustrated in FIG. 5, since both the gear stage of the traveling range and the neutral traveling pattern in the neutral control are defined according to the vehicle speed, gear stages Nrev and N1-N8 which are applied in the neutral control (i.e., applied in the N-range of the automatic transmission 10) are defined for convenience so as to be associated with the nine gear stages (the reverse gear and the first to eighth gears). The gear stages Nrev and N1-N8 are defined for convenience in the neutral control, and are not actually applied to the friction engagement elements 25 of the automatic transmission 10, but the neutral traveling patterns 1-3 are actually applied to the friction engagement elements 25. Note that in FIG. 5, "x" indicates the friction engagement element 25 which is disengaged among the three friction engagement elements 25 which are engaged at the gear stage of the traveling range, corresponding to each gear stage in the neutral control.

In detail, as illustrated in FIG. 5, the neutral traveling pattern 1 in which the first brake BR1 and the second brake BR2 are engaged is applied commonly to Nrev, N1, and N2 corresponding to the reverse gear, the first gear, and the second gear, respectively, which are adjacent to each other. That is, the two brakes (the first brake BR1 and the second brake BR2) are engaged commonly to Nrev, N1, and N2. This is because the first brake BR1 and the second brake BR2 are engaged commonly at the reverse gear, the first gear, and the second gear from the beginning. In this case, when the controller 50 performs the neutral control while the vehicle travels in the traveling range of any of the reverse gear, the first gear, and the second gear, it disengages the third clutch CL3 at the reverse gear, disengages the first clutch CL1 at the first gear, and disengages the second clutch CL2 at the second gear to control the hydraulic pressure control valves 40 of the friction engagement elements 25 to form the neutral traveling pattern 1 in which the first brake BR1 and the second brake BR2 are engaged.

Further, at N4 and N5 corresponding to the fourth and fifth gears which are adjacent to each other, the neutral traveling pattern 2 in which the third clutch CL3 and the second brake BR2 are engaged is applied commonly. That is, at N4 and N5, two elements (the third clutch CL3 and the second brake BR2) are engaged commonly. This is because, at the fourth and fifth gears, the third clutch CL3 and the second brake BR2 are engaged commonly from the beginning. In this case, when performing the neutral control while the vehicle travels in the traveling range of the fourth gear or the fifth gear, the controller 50 disengages the second clutch CL2 at the fourth gear, and disengages the first clutch CL1 at the fifth gear to control the hydraulic pressure control valves 40 of the friction engagement elements 25 to form the neutral traveling pattern 2 in which the third clutch CL3 and the second brake BR2 are engaged.

Further, at N7 and N8 corresponding to the seventh and eighth gears which are adjacent to each other, the neutral traveling pattern 3 in which the third clutch CL3 and the first brake BR1 are engaged is applied commonly. That is, at N7 and N8, two elements (the third clutch CL3 and the first brake BR1) are engaged commonly. This is because, at the seventh and eighth gears, the third clutch CL3 and the first brake BR1 are engaged commonly from the beginning. In this case, when performing the neutral control while the vehicle travels in the traveling range of the seventh gear or the eighth gear, the controller 50 disengages the first clutch CL1 at the seventh gear, and disengages the second clutch CL2 at the eighth gear to control the hydraulic pressure control valves 40 of the friction engagement elements 25 to form the neutral traveling pattern 3 in which the third clutch CL3 and the first brake BR1 are engaged.

Thus, in this embodiment, the two friction engagement elements 25 which are engaged in order to form the neutral state are common to Nrev, N1, and N2 corresponding to the reverse gear, the first gear, and the second gear, common to N4 and N5 corresponding to the fourth gear and the fifth gear, and common to N7 and N8 corresponding to the seventh gear and the eighth gear. Thus, the three neutral traveling patterns 1-3, which are fewer than the nine gear stages for the traveling range, are defined.

At the third gear, it is not the case that both the first brake BR1 and the second brake BR2, which are engaged in the neutral traveling pattern 1, are engaged, and it is not the case that both the third clutch CL3 and the second brake BR2, which are engaged in the neutral traveling pattern 2, are engaged. Therefore, in this embodiment, exceptionally, N3 corresponding to the third gear is not defined (indicated by hatching in FIG. 5). Instead, N2 which uses the neutral traveling pattern 1 is applied to the third gear. In this case, when performing the neutral control while the vehicle travels in the traveling range of the third gear, the controller 50 disengages the first and second clutches CL1 and CL2, while the second brake BR2 which is engaged at the third gear is kept engaged, and engages another brake (first brake BR1) to form the neutral traveling pattern 1 in which the first brake BR1 and the second brake BR2 are engaged. Note that when performing the neutral control while the vehicle travels in the traveling range of the third gear, the controller 50 may once change the gear stage of the traveling range from the third gear to the second gear and then form the neutral traveling pattern 1.

For the same reason, N6 corresponding to the sixth gear is not defined in this embodiment (indicated by hatching in FIG. 5). Instead, N5 which uses the neutral traveling pattern 2 is applied to the sixth gear. In this case, when performing the neutral control while the vehicle travels in the traveling range of the sixth gear, the controller 50 disengages the first and second clutches CL1 and CL2, while the third clutch CL3 which is engaged at the sixth gear is kept engaged, and engages another brake (second brake BR2) to form the neutral traveling pattern 2 in which the third clutch CL3 and the second brake BR2 are engaged. Note that when performing the neutral control while the vehicle travels in the traveling range of the sixth gear, the controller 50 may once change the gear stage of the traveling range from the sixth to the fifth gear and then form the neutral traveling pattern 2.

Figure 7:
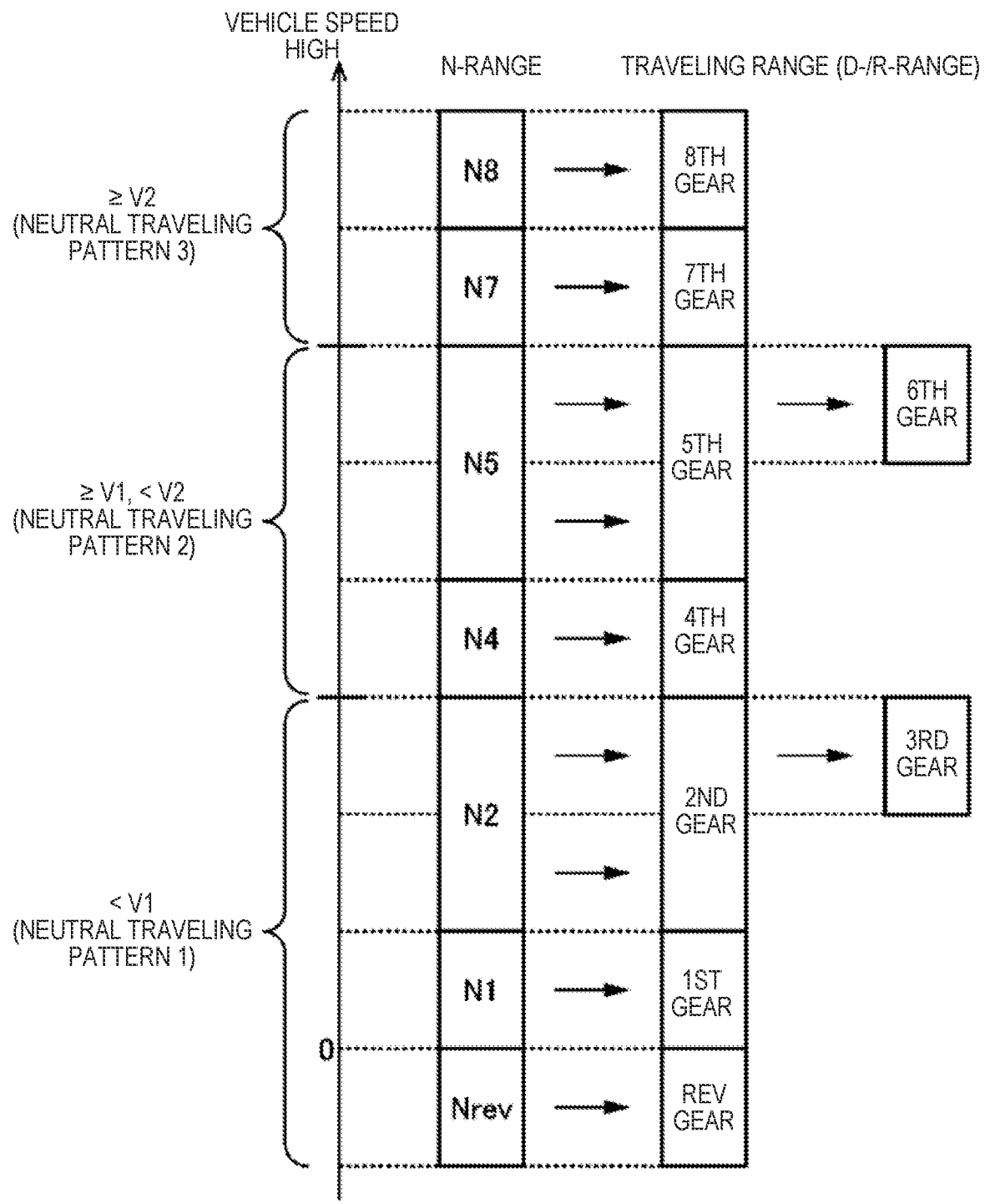
FIG. 7 is a view illustrating a control performed when changing from the neutral control to the traveling range in the embodiment of the present disclosure.

Next, referring to FIG. 7, a control performed in this embodiment when changing from the neutral control to the traveling range (D-range or R-range) is described. First, during the neutral control, one of the neutral traveling patterns 1-3 according to the vehicle speed is applied. In detail, as illustrated in FIG. 7, when the vehicle speed is below the first vehicle speed V1, the neutral traveling pattern 1 is applied, when the vehicle speed is the first vehicle speed V1 or more and below the second vehicle speed V2, the neutral traveling pattern 2 is applied, and when the vehicle speed is the second vehicle speed V2 or more, the neutral traveling pattern 3 is applied. Further, as described above, in the neutral control, the gear stages according to the vehicle speed (Nrev, and N1-N8 (excluding N3 and N6)) are defined besides the neutral traveling patterns 1-3.

When changing from the neutral control to the traveling range, the gear stage according to the vehicle speed is applied. In detail, the gear stage of the traveling range corresponding to the gear stage defined in the neutral control is applied. In detail, first, when Nrev is applied in the neutral control (hereinafter, this gear stage is defined based on the vehicle speed immediately before the change from the neutral control to the traveling range), the controller 50 newly engages the third clutch CL3, while the first brake BR1 and the second brake BR2 are kept engaged, in order to change the gear stage to the reverse gear (see FIG. 5). Further, when N1 is applied in the neutral control, the controller 50 newly engages the first clutch CL1, while the first brake BR1 and the second brake BR2 are kept engaged, in order to change the gear stage to the first gear.

Further, when N2 is applied in the neutral control, the controller 50 newly engages the second clutch CL2, while the first brake BR1 and the second brake BR2 are kept engaged, in order to change the gear stage to the second gear. In this case, the vehicle speed during the neutral control may be higher than a vehicle speed corresponding to the second gear (i.e., it may be a vehicle speed corresponding to the third gear). This is because, as described above, N3 corresponding to the third gear is not defined (i.e., N2 corresponding to the second gear also serves as N3). In this case, as illustrated in FIG. 7, the controller 50 further changes the gear stage to the third gear, after the gear stage is changed to the second gear.

Further, when N4 is applied in the neutral control, the controller 50 newly engages the second clutch CL2, while the third clutch CL3 and the second brake BR2 are kept engaged, in order to change the gear stage to the fourth gear. Further, when N5 is applied in the neutral control, the controller 50 newly engages the first clutch CL1, while the third clutch CL3 and the second brake BR2 are kept engaged, in order to change the gear stage to the fifth gear. In this case, the vehicle speed during the neutral control may be higher than a vehicle speed corresponding to the fifth gear (i.e., it may be a vehicle speed corresponding to the sixth gear). This is because, as described above, N6 corresponding to the sixth gear is not defined (i.e., N5 corresponding to the fifth gear also serves as N6). In this case, as illustrated in FIG. 7, after the gear stage is changed to the fifth gear, the controller 50 further changes the gear stage to the sixth gear.

Further, when N7 is applied in the neutral control, the controller 50 newly engages the first clutch CL1, while the third clutch CL3 and the first brake BR1 are kept engaged, in order to change the gear stage to the seventh gear. Further, when N8 is applied in the neutral control, the controller 50 newly engages the second clutch CL2, while the third clutch CL3 and the first brake BR1 are kept engaged, in order to change the gear stage to the eighth gear.

Figure 8:
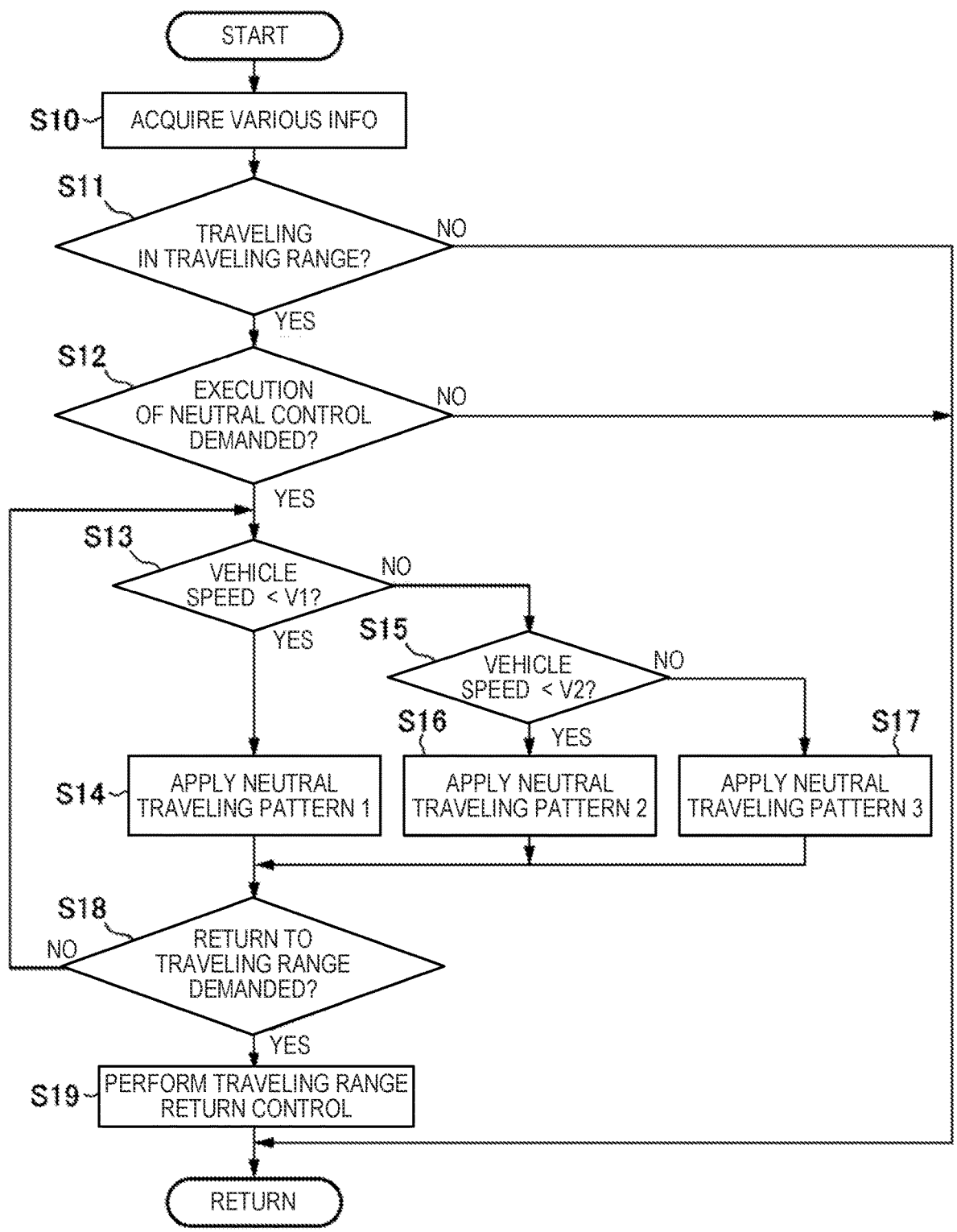
FIG. 8 is a flowchart illustrating the neutral control according to the embodiment of the present disclosure.

Next, referring to FIG. 8, a concrete flow of the neutral control performed by the controller 50 in this embodiment is described. FIG. 8 is a flowchart illustrating the neutral control according to this embodiment. This control is repeatedly performed by the microprocessor 50a in the controller 50 based on the program stored in the memory 50b at a given cycle.

First, at Step S10, the controller 50 acquires a variety of information corresponding to the signals from the sensors SN1-SN6 (see FIG. 4). In detail, the controller 50 acquires at least the vehicle speed detected by the vehicle speed sensor SN1, the acceleration (particularly, the deceleration) detected by the acceleration sensor SN2, the range (shift range) detected by the shift position sensor SN3, the rotational speed of the input shaft 12 detected by the AT input rotational speed sensor SN4, the rotational speed of the output shaft 13 detected by the AT output rotational speed sensor SN5, and the hydraulic pressure detected by the hydraulic pressure sensor SN6.

Next, at Step S11, the controller 50 determines whether the vehicle 1 travels in the traveling range (D-range or R-range), based on the range and the vehicle speed which are acquired at Step S10. As a result, if the vehicle 1 is determined to be traveling in the traveling range (Step S11: Yes), the controller 50 shifts to Step S12, and if the vehicle 1 is not determined to be traveling in the traveling range (Step S11: No), it escapes from the routine according to the neutral control.

Next, at Step S12, the controller 50 determines whether execution of the neutral control is demanded. In this case, when the range acquired at Step S10 is changed from the traveling range to the N-range (i.e., when the driver performs operation of the shift lever 30 (shift operation) to change the range of the automatic transmission 10 from the traveling range to the N-range), the controller 50 determines that execution of the neutral control is demanded. Further, when the deceleration acquired at Step S10 is the given value or more (i.e., when the vehicle 1 slows down suddenly), the controller 50 determines that execution of the neutral control is demanded. In this case, the controller 50 may perform this judgment further using the rotational speed of the input shaft 12 (detected by the AT input rotational speed sensor SN4) of the automatic transmission 10. In detail, the controller 50 may determine that execution of the neutral control is demanded, when the deceleration is the given value or more and the rotational speed of the input shaft 12 is below a given value. At Step S12, if it is determined that execution of the neutral control is demanded (Step S12: Yes), the controller 50 shifts to Step S13, and, on the other hand, if not determined that execution of the neutral control is demanded (Step S12: No), the controller 50 escapes from the routine according to the neutral control.

Next, at Step S13, the controller 50 determines whether the vehicle speed acquired at Step S10 is below the first vehicle speed V1. As a result, if the vehicle speed is determined to be below the first vehicle speed V1 (Step S13: Yes), the controller 50 shifts to Step S14. At Step S14, the controller 50 controls the hydraulic pressure control valves 40 of the friction engagement elements 25 to form the neutral traveling pattern 1 in which the first brake BR1 and the second brake BR2 are engaged (see FIGS. 5 and 6). Then, the controller 50 shifts to Step S18.

On the other hand, if the vehicle speed is not determined to be below the first vehicle speed V1 (Step S13: No), the controller 50 shifts to Step S15. At Step S15, the controller 50 determines whether the vehicle speed acquired at Step S10 is below the second vehicle speed V2. As a result, if the vehicle speed is determined to be below the second vehicle speed V2 (Step S15: Yes), the controller 50 shifts to Step S16. This case corresponds to when the vehicle speed is the first vehicle speed V1 or more and below the second vehicle speed V2. At Step S16, the controller 50 controls the hydraulic pressure control valves 40 of the friction engagement elements 25 to form the neutral traveling pattern 2 in which the third clutch CL3 and the second brake BR2 are engaged (see FIGS. 5 and 6). Then, the controller 50 shifts to Step S18.

On the other hand, if the vehicle speed is not determined to be below the second vehicle speed V2 (Step S15: No), the controller 50 shifts to Step S17. This case corresponds to when the vehicle speed is the second vehicle speed V2 or more. At Step S17, the controller 50 controls the hydraulic pressure control valves 40 of the friction engagement elements 25 to form the neutral traveling pattern 3 in which the third clutch CL3 and the first brake BR1 are engaged (see FIGS. 5 and 6). Then, the controller 50 shifts to Step S18.

Note that at Steps S13 and S15, although the determination is made based on the vehicle speed, the determination may be made based on the rotational speed of the output shaft 13 (detected by the AT output rotational speed sensor SN5) of the automatic transmission 10, instead of the vehicle speed. The rotational speed of the output shaft 13 corresponds uniquely to the vehicle speed.

Next, at Step S18, the controller 50 determines whether there is a demand for ending the neutral control and returning to the traveling range. In this case, when the range acquired at Step S10 is changed from the N-range to the traveling range (D-range or R-range) (i.e., when the driver performs operation of the shift lever 30 (shift operation) to change the range of the automatic transmission 10 from the N-range to the traveling range), the controller 50 determines that there is the demand for returning to the traveling range. Further, when the deceleration acquired at Step S10 is below the given value (i.e., when the sudden deceleration of the vehicle 1 is finished), the controller 50 determines that there is the demand for returning to the traveling range. In this case, the controller 50 may perform this judgment further using the rotational speed of the input shaft 12 of the automatic transmission 10. In detail, when the deceleration is below the given value and the rotational speed of the input shaft 12 is the given value or more, the controller 50 may determine that there is the demand for returning to the traveling range.

At Step S18, if it is determined that there is the demand for returning to the traveling range (Step S18: Yes), the controller 50 shifts to Step S19, and, on the other hand, if not determined that there is the demand for returning to the traveling range (Step S18: No), the controller 50 returns to Step S13. In the latter case, the controller 50 repeats Steps S13-S18 until it is determined that there is the demand for returning to the traveling range. In this case, the controller 50 selectively changes the neutral traveling pattern to be applied among the neutral traveling patterns 1-3, according to the vehicle speed which varies during the neutral control.

Next, at Step S19, the controller 50 performs a control for ending the neutral control and returning to the traveling range. In detail, the controller 50 sets to the traveling range the gear stage (the reverse gear, the first to eighth gears (excluding the third gear and sixth gear)) corresponding to the gear stage (Nrev, N1-N8 (excluding N3 and N6)) according to the vehicle speed when ending the neutral control. Fundamentally, while the two friction engagement elements 25 engaged in the neutral traveling pattern applied in the neutral control are kept engaged, the controller 50 controls the hydraulic pressure control valves 40 of the friction engagement elements 25 to newly engage one friction engagement element 25 according to the gear stage of the traveling range to be applied. Here, when the gear stage during the neutral control is N2, and the vehicle speed during the neutral control is higher than the vehicle speed corresponding to the second gear (i.e., when it is the vehicle speed corresponding to the third gear), the controller 50 further changes the gear stage to the third gear (see FIG. 7), after the gear stage is changed to the second gear. Similarly, when the gear stage during the neutral control is N5, and the vehicle speed during the neutral control is higher than the vehicle speed corresponding to the fifth gear (i.e., when it is the vehicle speed corresponding to the sixth gear), the controller 50 further changes the gear stage to the sixth gear, after the gear stage is changed to the fifth gear. After Step S19, the controller 50 escapes from the routine according to the neutral control.

[Operation and Effects]

Next, operation and effects of the control system 100 of the vehicle 1 according to this embodiment are described. In this embodiment, in order to set the automatic transmission 10 to the neutral state, the controller 50 performs the neutral control in which two of the three friction engagement elements 25 which are engaged when forming each gear stage of the automatic transmission 10 are kept engaged and one remaining friction engagement element 25 is disengaged, and it also performs the neutral control so that the two friction engagement elements 25 which are engaged during the neutral control are common to at least two adjacent gear stages. That is, in this embodiment, the two friction engagement elements 25 which are engaged in order to form the neutral state among the three friction engagement elements 25 engaged in a certain gear stage are the same as the two friction engagement elements 25 which are engaged in order to form the neutral state among the three friction engagement elements 25 engaged in the adjacent gear stage.

Thus, in this embodiment, the automatic transmission 10 is set to the neutral state in the neutral control by, while two of the three friction engagement elements 25 engaged when forming the gear stage of the automatic transmission 10 are kept engaged, disengaging the one remaining friction engagement element 25. Thus, the shock which occurs when changing from the neutral state to the traveling range due to a large number of rotating elements corresponding to the friction engagement elements 25 rotating in the indefinite state inside the automatic transmission 10 can be suppressed. Further, in this embodiment, since the two friction engagement elements 25 used for the gear stage formation in the neutral control are kept engaged, and these two friction engagement elements 25 are used commonly in at least two adjacent gear stages, only one friction engagement element 25 according to the gear stage to be applied is required to be engaged. Therefore, the responsiveness of the change from the neutral state to the traveling range can be secured.

In this embodiment, the controller 50 is configured to realize the plurality of neutral traveling patterns by changing the combination of the two friction engagement elements 25 which are engaged during the neutral control among the plurality of friction engagement elements 25. The number of neutral traveling patterns (three) is less than the number of gear stages in the traveling range (nine). As described above, since the two friction engagement elements 25 which are engaged during the neutral control are used commonly in at least two adjacent gear stages, the number of neutral traveling patterns becomes less than the number of gear stages in the traveling range. Therefore, it becomes possible to simplify the control configuration related to the neutral control.

Further, in this embodiment, the controller 50 is configured to selectively set a neutral traveling pattern to be applied among the plurality of neutral traveling patterns based on the vehicle speed. As described above, the friction engagement element 25 engaged in each of the plurality of neutral traveling patterns is defined based on the friction engagement element 25 engaged at each of the gear stages according to the vehicle speed. Therefore, by applying the neutral traveling pattern according to the vehicle speed in the neutral control, the gear stage can be set promptly according to the vehicle speed, when changing from the neutral control to the traveling range.

In this embodiment, the controller 50 is configured to start the neutral control, when the driver performs the shift operation to change the range of the automatic transmission 10 from the traveling range to the N-range (neutral range), while the vehicle 1 travels in a state in which the range of the automatic transmission 10 is set to the traveling range. Therefore, according to the shift operation by the driver, the neutral control can be started promptly, and it becomes possible to exactly satisfy the change demand to the N-range by the driver.

Further, in this embodiment, the controller 50 is configured to, when the driver performs the shift operation to change the range of the automatic transmission 10 from the N-range to the traveling range during the neutral control, end the neutral control and control the friction engagement elements 25 to set the automatic transmission 10 to the gear stage according to the vehicle speed. Therefore, according to the shift operation by the driver, the neutral control can be ended promptly, and the automatic transmission 10 can be returned to the normal traveling range.

Further, in this embodiment, the controller 50 is configured to start the neutral control, when the deceleration of the vehicle I reaches the given value or more, while the vehicle 1 travels in the state in which the range of the automatic transmission 10 is set to the traveling range. Therefore, when the vehicle 1 slows down suddenly, the neutral control can be started promptly. Particularly, in this embodiment, the vehicle 1 is configured so that the driving force of the engine 20 is transmitted to the driving wheels 60 without the intervention of the torque converter. Thus, although the engine stall may occur when such a sudden deceleration occurs, by performing the neutral control promptly at this time, the engine stall can be prevented certainly.

Further, in this embodiment, the controller 50 is configured to, when the deceleration of the vehicle 1 during the neutral control decreases below the given value, end the neutral control and control the friction engagement elements 25 to set the automatic transmission 10 to the gear stage according to the vehicle speed. Therefore, when the sudden deceleration of the vehicle 1 is finished, the neutral control can be ended promptly to resume the automatic transmission 10 back to the normal traveling range.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
10 Automatic Transmission
20 Engine
25 Friction Engagement Elements
30 Shift Lever
40 Hydraulic Pressure Control Valve
50 Controller
60 Driving Wheels BR1 First Brake
BR2 Second Brake
CL1 First Clutch
CL2 Second Clutch
CL3 Third Clutch

What is claimed is:

1. A control system of a vehicle, comprising:
an automatic transmission configured to transmit a driving force of a drive source of the vehicle to driving wheels, provided with a plurality of friction engagement elements changeable between an engaged state and a disengaged state, and configured to form a plurality of gear stages by changing a combination of three friction engagement elements to be selectively engaged among the plurality of friction engagement elements; and
a controller configured to control the change between the engaged state and the disengaged state of each of the plurality of friction engagement elements of the automatic transmission,
wherein the controller performs a neutral control in which, in order to set the automatic transmission to a neutral state in which the driving force of the drive source is not transmitted to the driving wheels, while two of the three friction engagement elements engaged when forming each of the gear stages of the automatic transmission are kept engaged, the remaining one of the three friction engagement elements is disengaged, and
wherein the controller performs the neutral control so that the two friction engagement elements engaged during the neutral control are common in at least two adjacent gear stages.

2. The control system of claim 1,
wherein the controller realizes a plurality of neutral traveling patterns by changing a combination of the two friction engagement elements selectively engaged among the plurality of friction engagement elements during the neutral control, and
wherein a number of the neutral traveling patterns is less than a number of the gear stages.

3. The control system of claim 2, wherein the controller sets a neutral traveling pattern to be selectively applied among the plurality of neutral traveling patterns based on a vehicle speed.

4. The control system of claim 1, wherein, while the vehicle travels in a state in which a range of the automatic transmission is set to a traveling range, the controller starts the neutral control when a driver performs a shift operation to change the range of the automatic transmission from the traveling range to a neutral range.

5. The control system of claim 4, wherein, when the driver performs a shift operation to change the range of the automatic transmission from the neutral range to the traveling range during the neutral control, the controller ends the neutral control and controls the friction engagement elements to set the automatic transmission to a gear stage according to a vehicle speed.

6. The control system of claim 1, wherein, while the vehicle travels in a state in which a range of the automatic transmission is set to a traveling range, the controller starts the neutral control when deceleration of the vehicle reaches a given value or more.

7. The control system of claim 6, wherein, when the deceleration of the vehicle decreases below the given value during the neutral control, the controller ends the neutral control and controls the friction engagement elements to set the automatic transmission to a gear stage according to a vehicle speed.

8. The control system of claim 6, wherein the control system is applied to the vehicle such that the driving force of the drive source is transmitted to the driving wheels without intervention of a torque converter.

9. The control system of claim 7, wherein the control system is applied to the vehicle such that the driving force of the drive source is transmitted to the driving wheels without intervention of a torque converter.

* * * * *